Sept. 27, 1938.  I. REISER  2,131,300

HAT BODY BLOCKING AND STRETCHING MACHINE

Filed June 14, 1937  3 Sheets—Sheet 2

ISIDORE REISER
INVENTOR.

BY *Joseph Blacker*
ATTORNEY

Sept. 27, 1938. I. REISER 2,131,300
HAT BODY BLOCKING AND STRETCHING MACHINE
Filed June 14, 1937 3 Sheets-Sheet 3
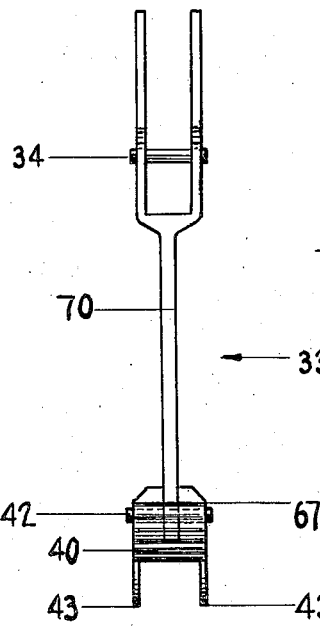
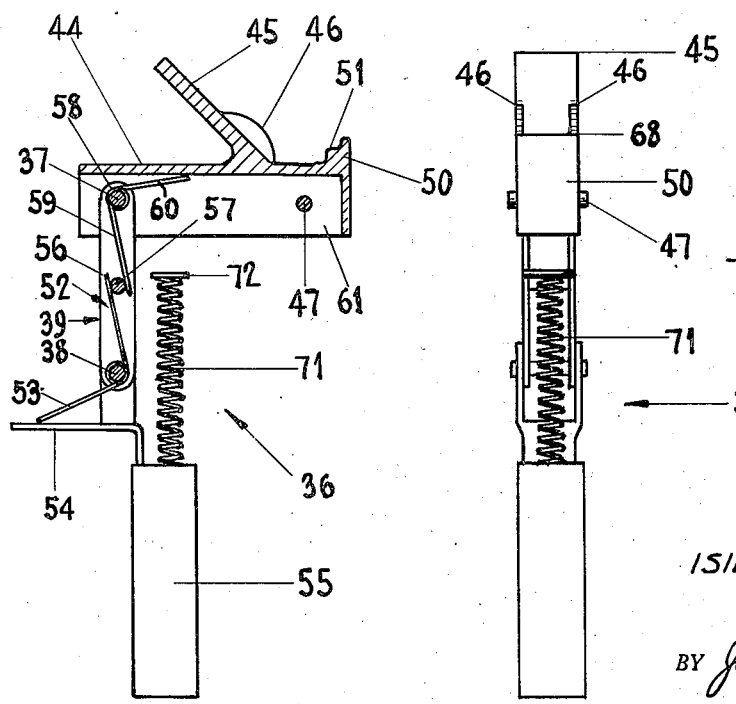
ISIDORE REISER
INVENTOR.
BY Joseph Blacker
ATTORNEY Patented Sept. 27, 1938

2,131,300

UNITED STATES PATENT OFFICE 2,131,300

HAT BODY BLOCKING AND STRETCHING MACHINE

Isidore Reiser, New York, N. Y.

Application June 14, 1937, Serial No. 148,162

3 Claims. (Cl. 223—15)

This invention relates to a hat blocking and stretching machine for stretching felt hat bodies to any desired shape.

Raw hat bodies made of wool felt are originally not in a stretched condition. When a raw hat body is to be molded to proper form and size, it is necessary to stretch the body from the lower edge portion while it is mounted on a mold.

This stretching operation has heretofore been performed by manual labor operations, that is, two blockers took a damp and steamed body and mounted it on a hat-shaped mold. They then grasped the lower edge portion of the body on diametrically opposite points and simultaneously pulled in opposite directions.

This operation resulted in an increase in the diametrical dimension of the body at these opposed points.

By repeating the stretching operation at about eight points equally spaced around the circumference of the lower edge portion, the body becomes considerably enlarged and stretched to the required form and acquires a shape consisting of a distinct crown and a distinct brim.

This stretching of a raw body into a finished hat having a distinct crown and brim shape was done on an internally heated aluminum mold resting on a table.

These stretching operations done manually by blockers resulted in deforming the fingers and the hands of the blockers and frequently resulted in blood poisoning due to the dyes entering the blistered skin of the operator.

An object of this invention is to provide a hat stretching mechanism in which the said stretching operations are performed automatically, by machine, and by a single operator.

Another object of this invention is to provide in combination with a two-member hat mold, a plurality of pivotally mounted clamp arms suspended from the upper mold member and being in vertically alined positions with a plurality of clamp arms pivotally mounted on the lower mold member, the said upper and lower arms forming coacting sets which jointly serve to grip the lower end portions of the body and to stretch the body into the required shape of a hat.

Another object of this invention is to provide separable clamping arms for the stretching mechanism and to form the engaging portions of the arms into clamping jaws having a plurality of interengaging teeth, each of substantially semi-circular cross-section so as to exert a clamping action on the hat body without tearing the body.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 3 is a side view of an assembled lower clamping member, partly in section.

Figure 4 is an end view of the assembled lower clamping member.

Figure 5 is an end view of an assembled upper clamping member.

Figure 1:
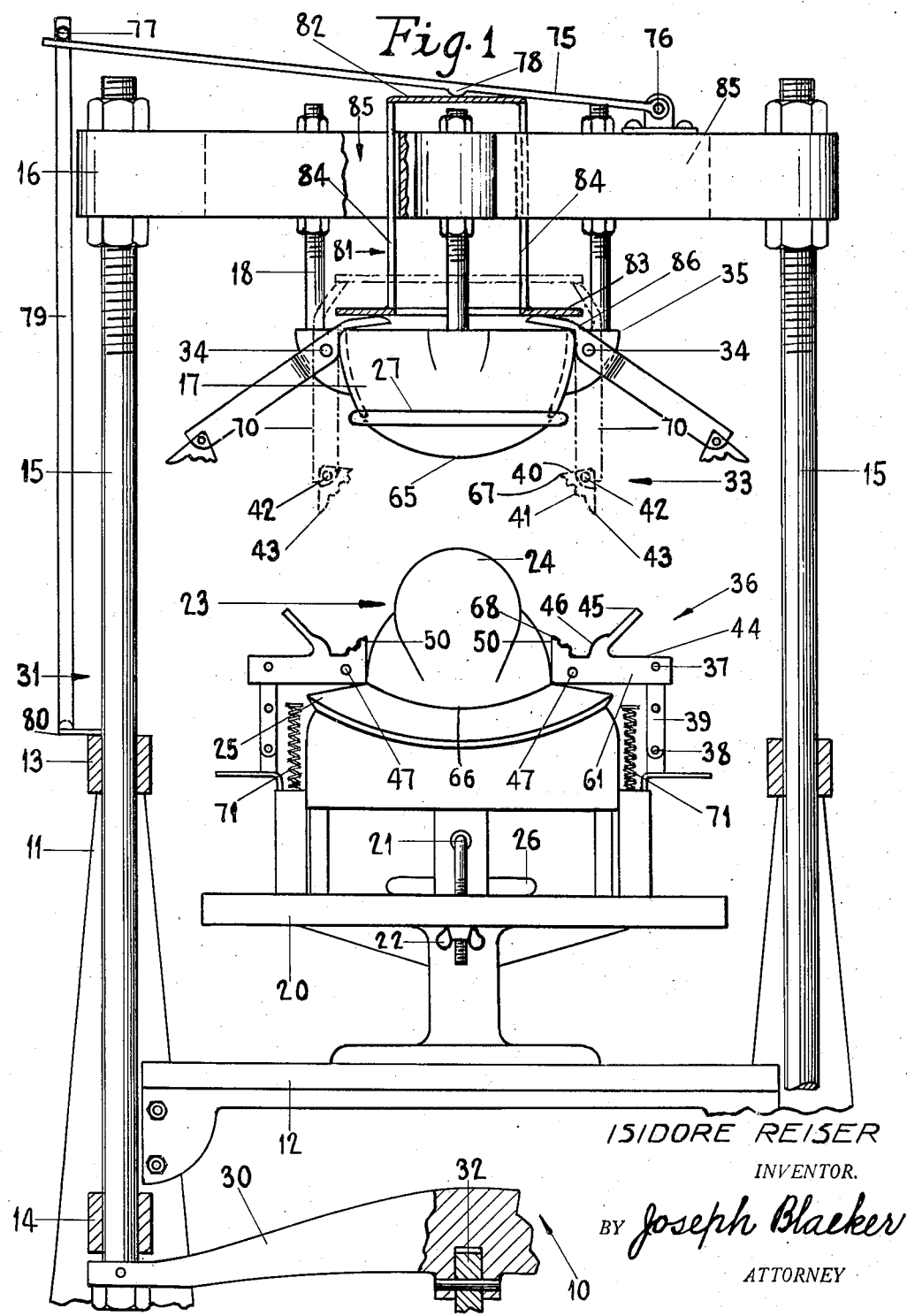
Figure 1 is a front elevation, partly in section, of a press having my stretching mechanism applied thereto and shown in loading position.

In the illustrated embodiment of the invention, the numeral 10 indicates a hat blocking and stretching machine, comprising a frame 11 having a fixed bed 12 and bearings 13, 14 designed to slidably support rods 15 to the upper ends of which has been secured a crosshead 16 and a hollow elliptical hat body molding member 17 secured together by bolts 18.

Mounted in superposed relation on the bed 12 is a bearing plate 20. Secured to the bearing plate 20 by bolts 21 and nuts 22 is a substantially elliptical hat body molding member 23 comprising an upper body portion 24 and a brim portion 25. The contour of the outer lower portion of the body 24 is of slightly smaller extent than the contour of the interior lower edge portion of the molding member 17 so as to allow sufficient room for the thickness of a hat body therebetween.

A gas heating element 26 is mounted at the central portion of the bearing plate 20 and in central relation with the molding member 23, and another heating element 27 is mounted on the exterior surface of the molding member 17 to heat the mold members and to facilitate the stretching, molding and baking of the felt hat body.

At the lower ends of the rods 15 there has been mounted a crosshead 30 which jointly with the cross head 16 and the rods 15 constitutes a movable frame 31.

Suitable power means such as a treadle (not shown) is pivotally secured to a link 32 at the central portion of the crosshead 30 for imparting up and down motion to the movable frame 31 in relation to the stationary frame 11.

My mechanism for automatically stretching a hat body comprises upper clamping members 33 pivotally mounted on pivots 34 in ears 35 projecting from the upper molding member 17 and lower clamping members 36. The lower clamping members 36 are pivotally mounted on pivots 37 and 38 at the upper and lower ends of a link 39.

At the lower end of each of the upper clamping members 33 is a jaw 40 having a plurality of teeth 41 of substantially semi-circular cross-section. The jaws 40 are mounted on pivots 42 with the teeth facing downwardly. The jaws 40 have downwardly facing wedge-shaped projections 43 on each side.

At the upper face 44 of each of the lower clamping members 36 is an angularly disposed guide member 45 which terminates at its junction with the upper face 44 in curved arms 46.

A pin 47 projects from opposite sides of the lower clamping members 36. The clamping members 36 have integral jaws 50 with a plurality of upwardly facing teeth 51 of substantially semi-circular cross-section.

A coil spring 52 has been mounted on the pivot 38 with one elongated end 53 pressing down on a horizontal extension 54 of a housing 55. The other end 56 of the spring 52 presses upwardly against a pin 57 fixed in the link 39 as shown in Figure 3.

A coil spring 58 has been mounted on the pivot 37 with one elongated end 59 pressing down against the pin 57. The other end 60 of the spring 58 presses upwardly against the lower surface of the lower jaw carrying member 61, as shown in Figure 3.

As best shown in Figure 3 the springs 52 and 58 function to raise the jaw carrying member 61 and force said member sideways against the lower molding member 23.

Figure 2:
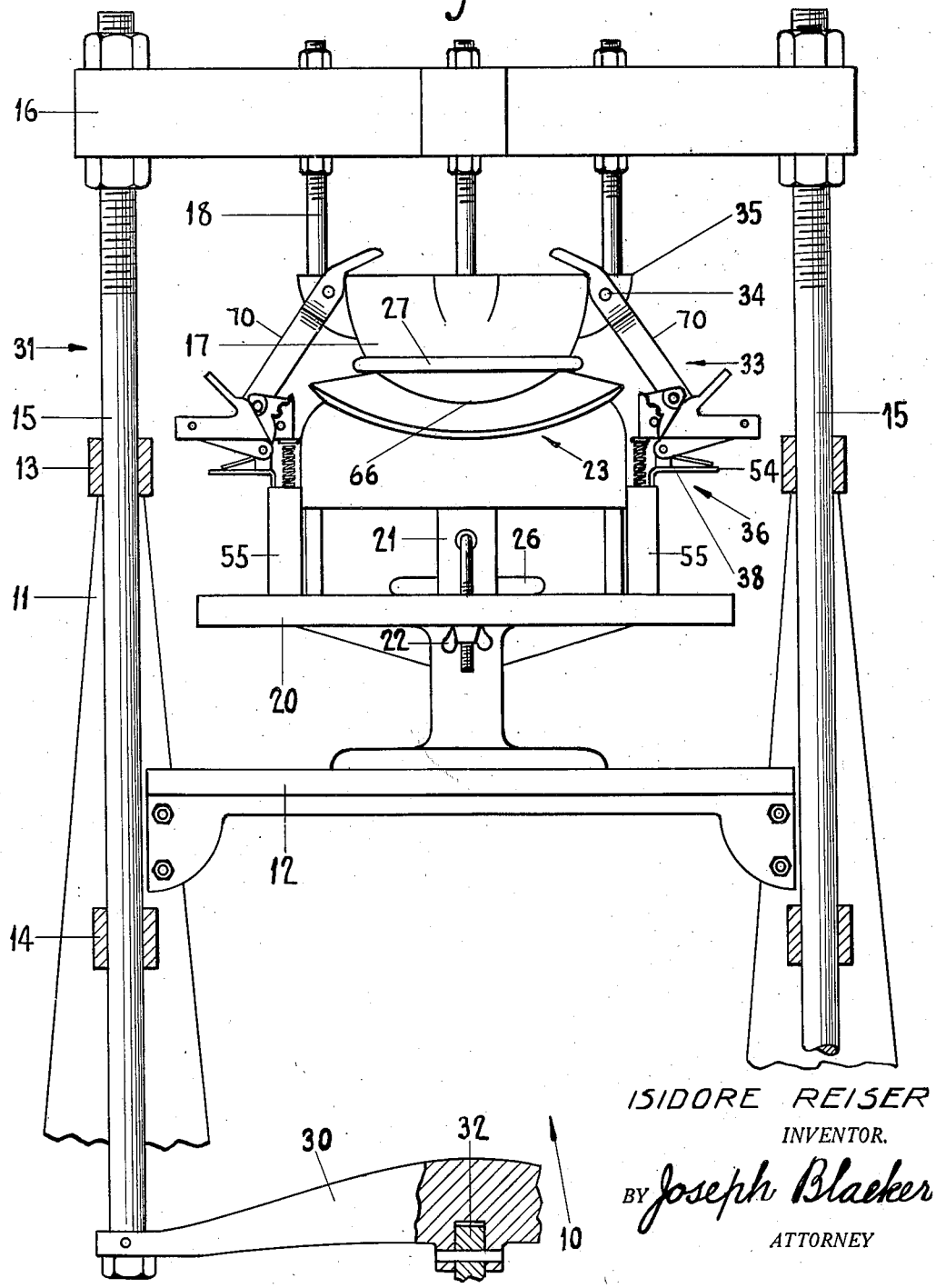
Figure 2 is a front elevation showing the stretching mechanism in operating position.

In operation, the operator places a hat body on the molding member 23 and actuates the treadle (not shown) and lowers the movable frame 31 until the lower edge 65 of the upper molding member 17 comes into engagement with the lower edge 66 of the molding member 23. The upper clamping members 33 move down simultaneously with the mold member 17 and the wedge-shaped projections 43 of the jaws 40 straddle the lower jaws 50. The top edges 67 of the upper jaws 40 contact with the top edges 68 of the lower jaws 50 causing the upper jaws to swing about the pins 42 until the pins contact the curved arms 46 and the wedge-shaped projections 43 contact the pins 47. The curved arms 46 cause the jaws 40 to move sideways towards the jaws 50 and the wedge-shaped arms 43 cause the jaws 40 to move downwardly towards the jaws 50. The pins 42 and 47 thus cause the upper and lower jaws to come together in clamping relation, as shown in Figure 2. The crown portion of the hat body is stretched simultaneously with the lower edge portion of the hat body resulting in the hat body assuming a definite blocked shape depending on the shape or design of the mold members 17 and 23.

It is to be noted that the entire stretching of the hat body is accomplished in one operation by one operator and that the amount of stretch is equal all around the hat body.

When a hat body is mounted on the lower mold member, the lower edge portion of the hat body lies on the angular guide members 45. The members 45 cause the hat body to assume a position in concentric relation with the lower mold member. The co-acting upper and lower jaws grip the lower edge portion of the hat body and on continuing the said downward movement of the frame 31 the upright arms 70 assume an angular position and cause the coacting sets of jaws to swing away from the lower mold member and stretch the hat body.

Coil springs 71 may be mounted inside the housings 55 and may have washers 72 at their upper ends in contact with the lower surface of the lower jaw and will rebound when compressed and will assist the upward movement of the lower jaws to a position on top of the brim portion of the molding member 23, when the stretching and blocking operations are complete.

It is to be noted that the link 39 swings about the pivot 38 with its upper portion in a horizontal direction; also that the jaw carrying member 61 swings about the pivot 37 in a vertical direction. The result is that the free end of the jaw carrying member 61 swings on a diagonal line and is thereby designed to follow the contour of the brim 25 of the lower mold member 23 irrespective what shape said brim may have.

As shown in Figure 1, I provide linkage mechanism comprising a lever 75 fulcrumed at 76 on the crosshead 16 and contacting at its free end with a pin 77 projecting from an arm 79 fixed to the frame 11 at a point 80. The lever 75 is in contacting relation at a point 78 with the upper surface of a hollow member 81. The member 81 comprises an upper disk 82 and a lower annular disk 83, connected by arms 84, passing through slots 85 in the crosshead 16. The disk 83 rests on upper extensions 86 of the arms 70. When the movable frame 31 moves upward into non-operating position, the lever 75 assumes the inclined position shown in Figure 1 and presses the lower surface of the member 81 against the extensions 86 of the arms 70, and raises the upper clamping members 33 so as to permit easy removal of the stretched hat body and easy insertion of another body to be stretched.

It is to be noted that while I have shown two sets of co-acting clamping members, that in practice there will be preferably eight sets of clamping members.

It is also to be noted that adjustments may be provided so that the mechanism may be suitable for all styles and sizes of hat bodies, and that various modifications may be made within the scope of the appended claims.

I claim:

1. In a hat blocking and stretching machine comprising a fixed lower unitary crown and brim molding member and a complemental upper hollow molding member mounted for movement in circumscribing relation over the crown of said lower mold member and down to the brim thereof, heating means mounted centrally of said lower molding member for heating said member interiorly thereof, further heating means mounted on the exterior surface of said upper molding member for heating said member exteriorly thereof, a plurality of two-part jointed clamping members pivotally mounted at diametrically opposite points adjacent the lower mold member, a plurality of two-part jointed clamping members pivotally mounted at diametrically opposite points on said upper mold member, said upper clamping members being respectively in alinement with said lower clamping members and providing co-acting sets of upper and lower clamping jaws, each of said upper jaws having a plurality of downwardly facing teeth for interlocking engagement with a plurality of teeth on said lower jaws, said lower clamping members having integral angular guide members for centering said hat body with said lower molding member prior to said interlocking engagement of said jaws, each of said lower clamping members comprising two angularly disposed pivotal members having clamping teeth adapted to move on top of said brim and to follow the contour thereof, said co-acting sets of jaws being disposed for swinging movement away from spaced points around said hat body and for stretching said hat body, and means for automatically swinging said upper clamping members upwardly sufficiently to permit mounting of a hat body on said lower mold member when said upper mold member moves up into non-operative position.

2. In a hat blocking and stretching machine comprising a lower unitary crown and brim molding member and a complemental upper hollow molding member mounted for movement in circumscribing relation over the crown of said lower mold member and down to the brim thereof and having heating means mounted thereon for heating said molding members individually, a plurality of jointed clamping members pivotally mounted at diametrically opposite points adjacent the lower mold member, a plurality of jointed clamping members pivotally mounted at diametrically opposite points adjacent said upper mold member, said upper clamping members being respectively in alinement with said lower clamping members and providing co-acting sets of upper and lower clamping jaws, each of said upper jaws having teeth for interlocking engagement with respective teeth on said lower jaws, said lower clamping members having guide members for centering said hat body with said lower molding member prior to said interlocking engagement of said jaws, each of said lower clamping members comprising two angularly disposed pivotal members having clamping teeth adapted to move on top of said brim and to follow the contour thereof, said sets of jaws being disposed for swinging movement away from spaced points around said hat body and for stretching said hat body, each of said lower clamping members being normally spring urged radially into contact with the crown of said lower molding member, each of said lower clamping members being movable on two pivots positioned outwardly and clear of the brim of said lower molding member to permit said clamping member to follow the contour of said brim.

3. In a hat blocking and stretching machine comprising a fixed and internally heated unitary crown and brim molding member and a complemental upper hollow and externally heated molding member mounted for movement in circumscribing relation over the crown of said lower mold member, a plurality of two-part jointed clamping members pivotally mounted at diametrically opposite points adjacent the lower mold member, a plurality of two-part jointed clamping members pivotally mounted at diametrically opposite points on said upper mold member, said upper clamping members being respectively in alinement with said lower clamping members and providing co-acting sets of upper and lower clamping jaws, each of said upper jaws having downwardly facing teeth for interlocking engagement with respective teeth on said lower jaws, said lower clamping members having integral angular guide members for centering said hat body with said lower molding member prior to said interlocking engagement of said jaws, each of said lower clamping members comprising two angularly disposed pivotal members having clamping teeth adapted to move on top of said brim and to follow the contour thereof, said sets of jaws being disposed for swinging movement away from spaced points around said hat body and for stretching said hat body simultaneously with the blocking of said body to style-shape, and means for automatically swinging said upper clamping members upwardly sufficiently to permit mounting of a hat body on said lower mold member when said upper mold member moves up into non-operative position.

ISIDORE REISER.